United States Patent
Marc et al.

(10) Patent No.: US 7,043,796 B2
(45) Date of Patent: May 16, 2006

(54) HINGE CONNECTOR ASSEMBLY

(75) Inventors: Robert Marc, 25 Central Park West, Apt. 8Q, New York, NY (US) 10023; Pierre Maiche, Nantes (FR)

(73) Assignee: Robert Marc, New York, NY (US)

(*) Notice: Subject to any disclaimer, the term of this patent is extended or adjusted under 35 U.S.C. 154(b) by 13 days.

(21) Appl. No.: 10/783,561

(22) Filed: Feb. 19, 2004

(65) Prior Publication Data

US 2005/0183237 A1  Aug. 25, 2005

(51) Int. Cl.
G02C 5/22  (2006.01)

(52) U.S. Cl. .......................... 16/228; 16/389; 351/118; 351/113; 351/121

(58) Field of Classification Search .................. 16/228, 16/389; 351/110, 41, 118 X, 149, 113, 114, 351/111, 121
See application file for complete search history.

(56) References Cited

U.S. PATENT DOCUMENTS

| | | | | |
|---|---|---|---|---|
| 2,684,014 A | * | 7/1954 | Simpson | 351/113 |
| 3,133,141 A | * | 5/1964 | Anderson | 351/118 |
| 3,189,912 A | * | 6/1965 | Miller | 351/118 |
| 3,271,094 A | * | 9/1966 | Wildermuth | 351/120 |
| 3,544,204 A | * | 12/1970 | Bienenfeld | 351/118 |
| 3,574,451 A | * | 4/1971 | Lazazzera | 351/121 |
| 3,873,192 A | * | 3/1975 | Anderson | 351/118 |
| 4,131,340 A | * | 12/1978 | Preston | 351/118 |
| 4,408,843 A | | 10/1983 | Bononi | |
| 5,367,346 A | | 11/1994 | Branning | |
| 5,473,395 A | | 12/1995 | Huang | |
| D384,365 S | | 9/1997 | Keith | |
| 5,760,867 A | * | 6/1998 | Pernicka et al. | 351/120 |
| 5,847,801 A | | 12/1998 | Masunaga | |
| 6,059,410 A | | 5/2000 | Wang | |
| 6,210,002 B1 | * | 4/2001 | Tachibana | 351/110 |
| D459,747 S | | 7/2002 | Marc et al. | |
| D459,748 S | * | 7/2002 | Marc et al. | 16/334 |
| 6,454,407 B1 | | 9/2002 | Mille | |
| 6,464,353 B1 | | 10/2002 | Spindelbalker | |
| D468,340 S | | 1/2003 | Marc et al. | |
| 6,502,941 B1 | | 1/2003 | Whisenant | |
| 6,505,933 B1 | | 1/2003 | Schuchard et al. | |
| 6,659,606 B1 | | 12/2003 | Duppstadt | |
| RE38,764 E | * | 7/2005 | Hirschman et al. | 351/47 |
| 6,971,743 B1 | * | 12/2005 | Jung | 351/44 |

* cited by examiner

Primary Examiner—Brian E. Glessner
Assistant Examiner—Mark Williams
(74) Attorney, Agent, or Firm—Gottlieb, Rackman & Reisman, P.C.

(57) ABSTRACT

A hinge connector assembly for securely attaching an earpiece to a frame of a pair of eyeglasses includes a hinge connector and connector clamp which secure an earpiece therebetween. The means for securing the earpiece comprise threaded bores attached to the connector clamp which combine with bolts inserted through bolt holes in the hinge connector. Further, notches located on the hinge connector combine with protruding tabs located on the connector clamp for added support. The hinge connector also includes a hinge element for attaching to a corresponding hinge element located on the frame of glasses.

37 Claims, 5 Drawing Sheets

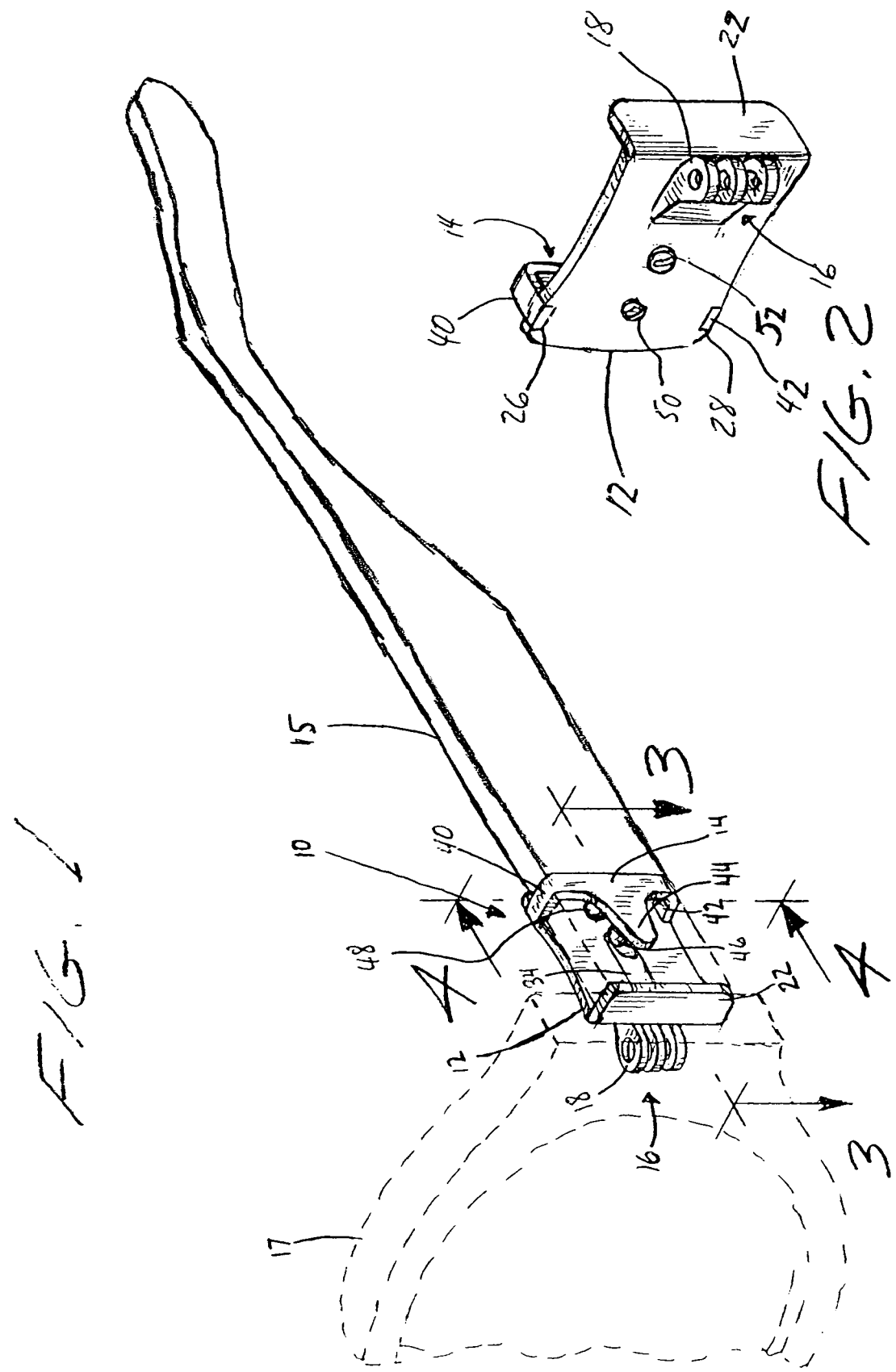

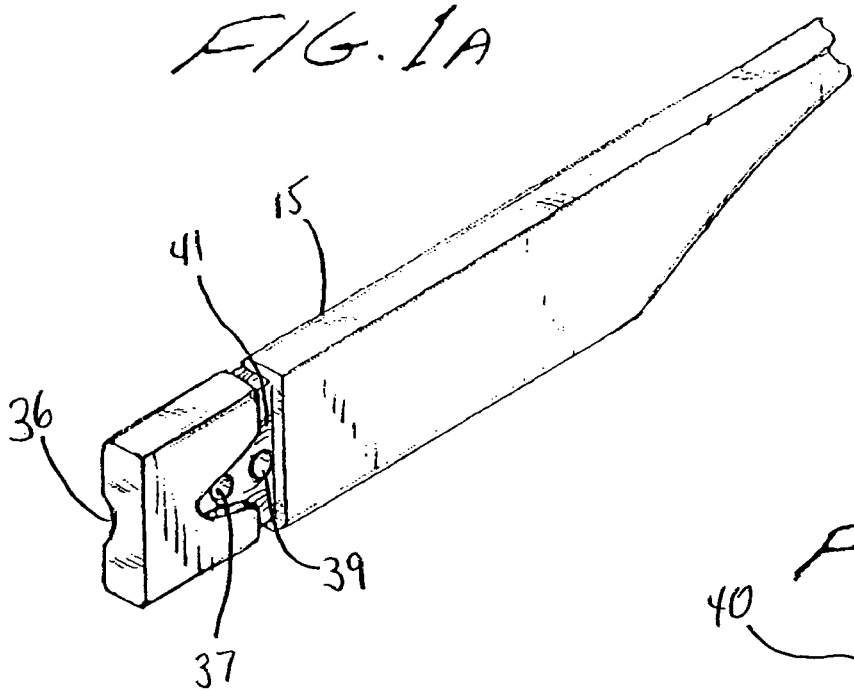
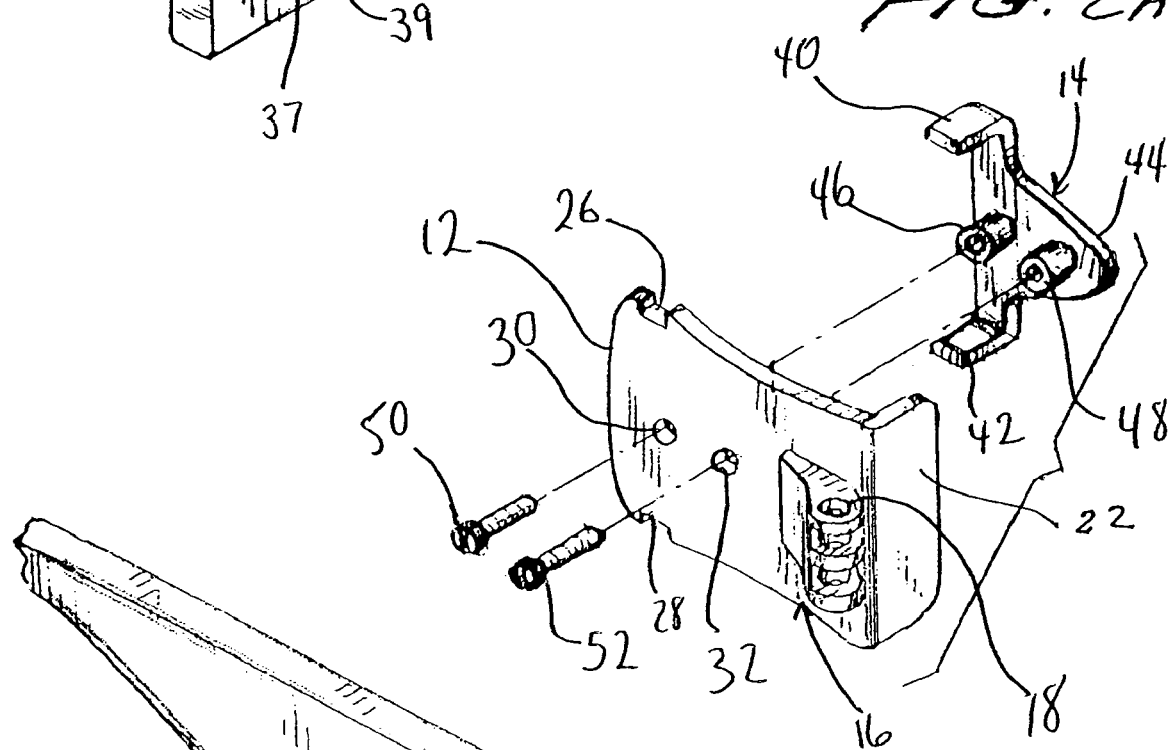
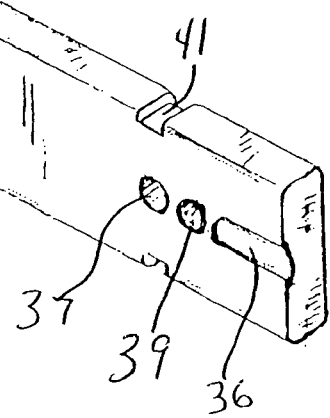

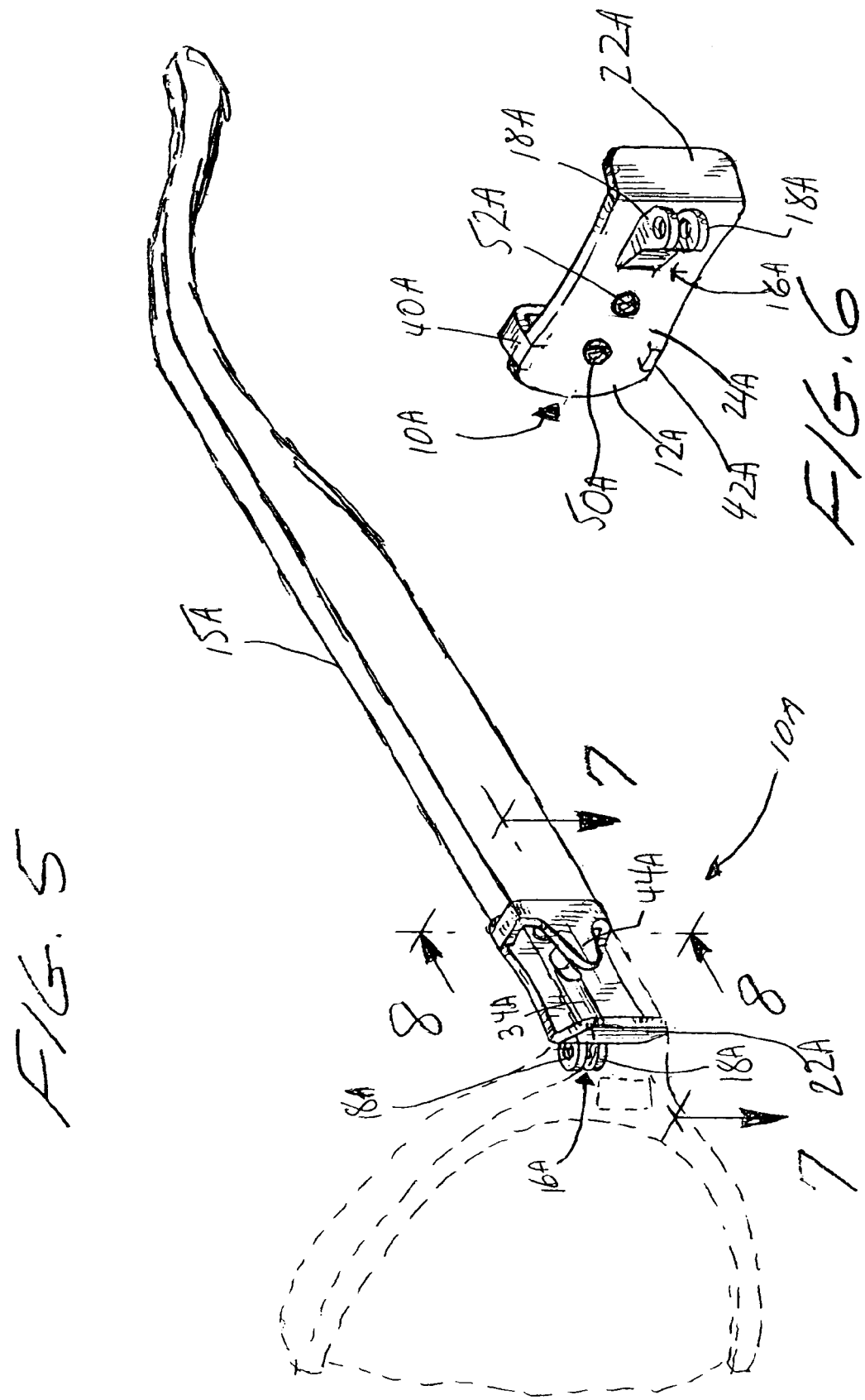

HINGE CONNECTOR ASSEMBLY

FIELD OF INVENTION

This invention relates to an improved hinge assembly for rotative movement around an axis between a plurality of components. More specifically, this invention involves an improved hinge connector assembly for securely linking the frames and earpieces of eyeglasses.

BACKGROUND OF THE INVENTION

A variety of hinge assemblies for eyeglasses are well known in the art. For both young hipsters as well as mature adults who prefer eyeglasses that comprise a relatively thickened frame and earpiece or temple component, these parts are often secured to one another with a screw or bolt without sufficient support integrated into the earpiece.

Therefore, in this form of conventional eyeglasses, there is significant strain in the area of the interlocking hinge. This strain can be caused by the weight of the earpiece during ordinary use or the result of external force, such as when an individual unintentionally steps on the glasses. These types strains inevitably cause the earpiece to come apart from the frame by loosening the bolt or screw or by tearing the hinge component off the earpiece.

Based on the nature of eyeglass earpieces which extend relatively far away from the hinge and frame, this problem exists even in more contemporary forms of eyeglasses which utilize spring hinges or which include a flexible earpiece. Since the force produced by the weight of the earpiece falls completely on the interlocking hinge, it may loosen the screw that secures the earpiece to the frame. Further, during the application of intense stress to the interlocking hinge, the earpiece may even simply break off.

Even in eyewear that utilizes a more firm and stable support structure for holding the earpiece to the frame, these supports are generally bulky and unsightly, such that individuals who consider themselves to be "stylish" prefer not to wear these eyeglasses.

BRIEF DESCRIPTION OF THE INVENTION

In view of the prior art deficiencies, the principle objective of the present invention is to provide an improved hinge assembly for securely linking together the frames and earpieces of eyeglasses.

Another objective of the present invention is to provide an improved hinge assembly that is integrated into the earpiece of eyeglasses.

A further objective of the present invention is to provide a hinge assembly that is neat, compact and less bulky than other prior art hinge assemblies.

An even further objective of the present invention is to provide a hinge assembly for eyeglasses that is stylish and more desirable to individuals of all ages.

Additional objectives will be apparent to those skilled in the art from the description of the invention as contained herein.

In its broadest aspects the invention is an improved hinge assembly for joining an earpiece or temple to the frame of a pair of glasses for rotative movement. In a preferred embodiment, the hinge connector assembly comprises a hinge connector and connector clamp which are fastened around an earpiece by a plurality of bolts proceeding through the interior of the earpiece.

For purposes providing a more secure fit around the earpiece, the hinge connector preferably includes notches for receiving tabs that extend from the connector clamp. Further, the earpiece preferably includes a depression or channel which mates with a ridge or bulge located on the hinge connector for providing a more secure fit and support. The earpiece also includes depressions for mating with the tabs that extend from the connector clamp.

Hinge ears attached to the hinge assembly interlock or conventionally link up with hinge ears attached to the frame with a screw or other means known in the art.

BRIEF DESCRIPTION OF THE DRAWINGS

FIG. 1 is a perspective view of a preferred embodiment of the hinge connector assembly fastened around an earpiece and attached to a frame of a pair of eyeglasses;

FIG. 1A is a perspective view of the interior surface of an earpiece having a plurality depressions for mating with the ridge on the hinge connector and the tabs extending from the connector clamp;

FIG. 1B is a perspective view of the exterior surface of an earpiece having a plurality of depressions for mating with the connector clamp and the tabs extending therefrom;

FIG. 2 is a perspective view of a preferred embodiment of a hinge connector assembly shown in FIG. 1 attached to the connector clamp by a connecting means without an earpiece disposed therebetween;

FIG. 2A is an exploded view of the hinge connector and connector clamp and connecting means;

FIG. 5 is a perspective view of another preferred embodiment of the hinge connector assembly fastened around an earpiece and attached to a frame of a pair of eyeglasses;

FIG. 6. is a perspective view of the embodiment shown in FIG. 5 of a hinge connector attached to the connector clamp by a connecting means without an earpiece disposed therebetween;

DETAILED DESCRIPTION OF THE INVENTION

Figure 3:
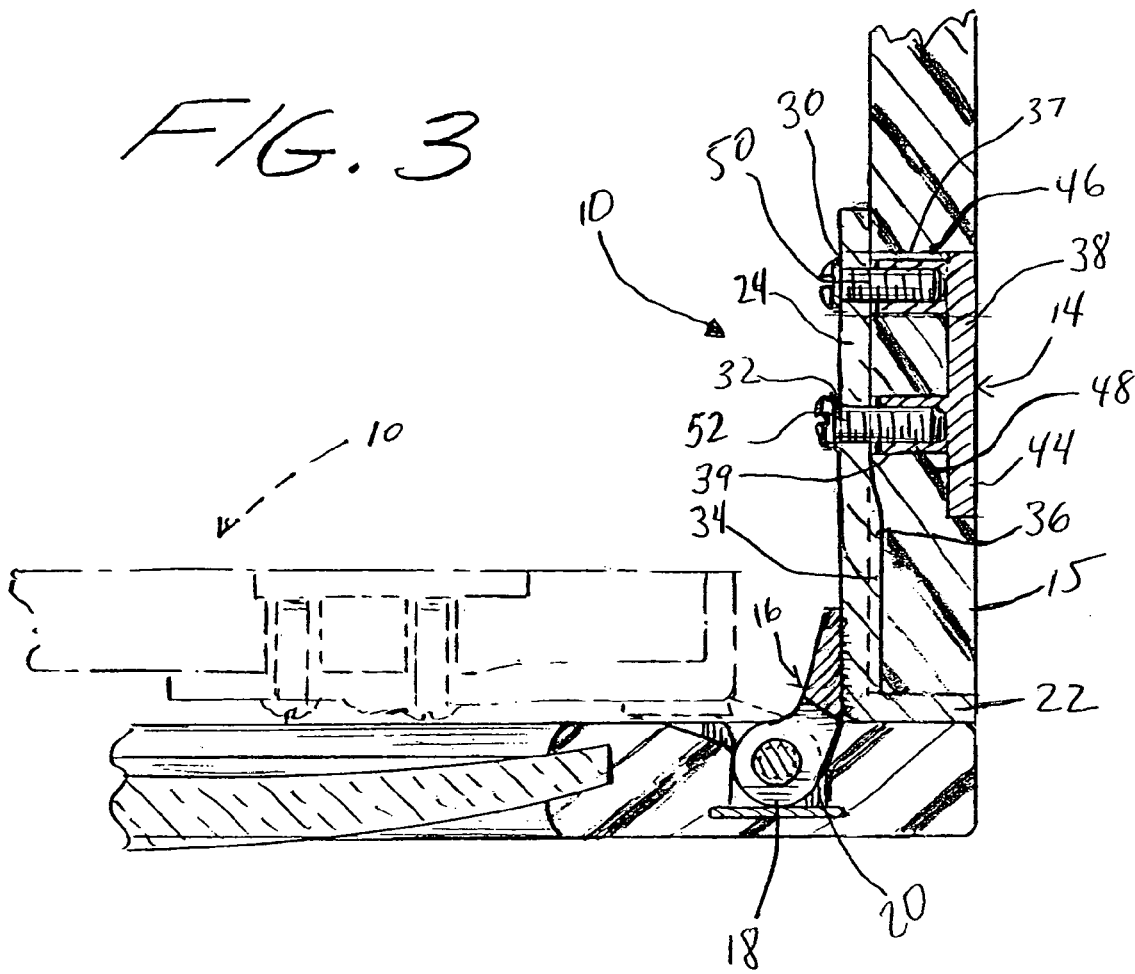
FIG. 3 is a cross sectional view taken along lines 3—3 of FIG. 1 of a hinge connector assembly fixed to a frame of eyeglasses and fastened around an earpiece in the open position with dashed lines representing the earpiece with attached components in the folded position.

Referring to the drawings, FIGS. 1 through 4 depict a preferred embodiment of the inventive hinge connector assembly (10). The assembly (10) comprises a hinge connector (12) and a connector clamp (14) fastened in the vicinity of the proximal extremity of an earpiece (15). The hinge connector (12) includes an end wall (22) and a plate (24). The plate (24) has receiving notches (26, 28) and bolt holes (30, 32), as well as an internal ridge (34) which extends outwardly adjacent to the earpiece (15). Significantly, as depicted in FIG. 1A, the earpiece (15) has an interior depression (36) allowing the ridge (34) to rest in between and against the earpiece (15). Preferably, the length, width and height dimensions of the ridge (34) correspond to the length, width and depth dimensions of the depression (36) respectively. As shown in FIG. 3, the ridge (34) is mated with the depression (36). Certainly, a number of configurations for the respective dimensions of the ridge (34) and depression (36) can be employed without departing from the spirit and scope of the invention. Further, any appropriate means for creating and shaping the depression (36) that are well known in the art may be utilized.

Preferably, the end wall (22) and plate (24) form an interior angle of ninety degrees which enables the wall (22) to be flush against the end of the earpiece (15) and the lens frame (17) of the eyeglasses. See FIG. 3.

The plate (24) also accommodates a hinge (16) that is attached to plate (24) by conventional welding or other means well known in the art. In this embodiment, the hinge (16) comprises three hinge ears (18) what are is linked to the lens frame (17) by virtue of a compatible set of hinge ears (20) or other corresponding structure attached to the frame (17). Of course any number of hinge ears on the assembly (10) and corresponding lens frame (17) may be utilized depending on the size of the frame (17). Accordingly, in glasses comprising relatively thinner earpieces, two hinge ears may be used, and vice versa. Further, the hinge (16) may also join with hinges or compatible structures that are attached directly to the lens, such as in glasses which do not have a conventional frame that proceeds around the entire perimeter of the lens. Therefore, for purposes of this description, where an area of an eyeglass lens accommodates a hinge structure, this portion of the lens is also referred to as a "frame."

Figure 4:
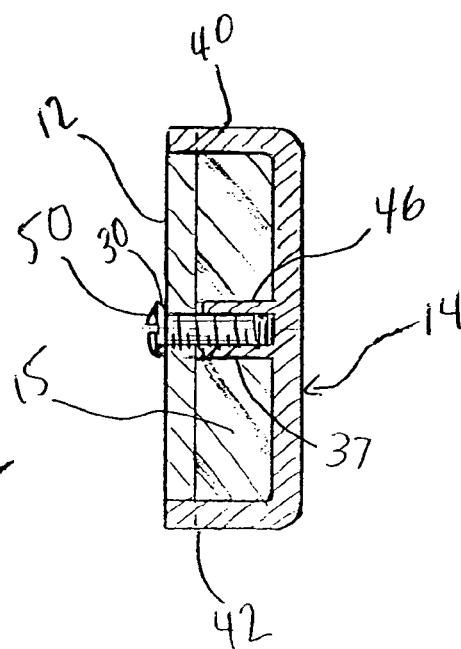
FIG. 4 is a cross sectional front view taken along lines 4—4 of FIG. 1 of a hinge connector assembly wherein the hinge connector and connector clamp are fastened around an earpiece.
Figure 7:
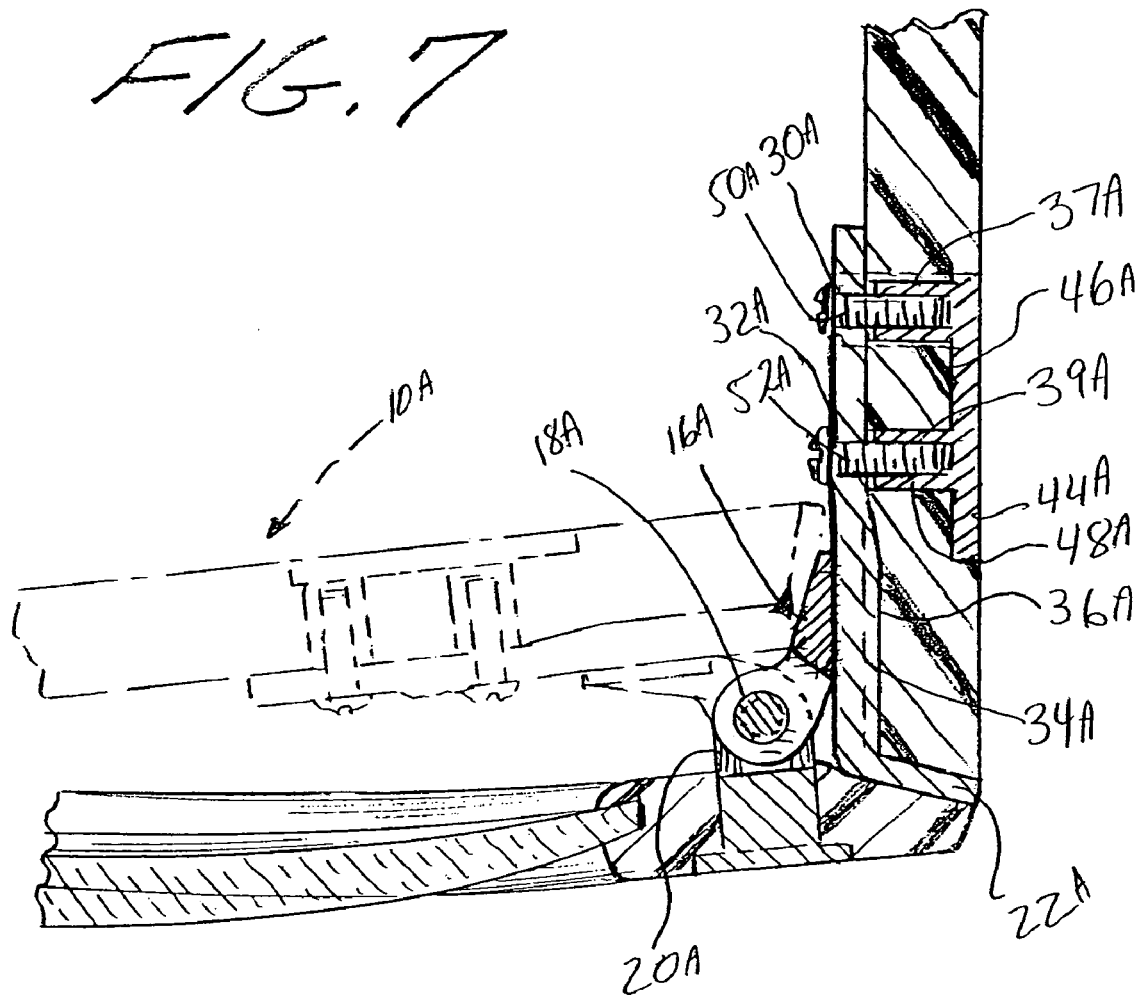
FIG. 7 is a cross sectional view taken along lines 7—7 if FIG. 5 of a hinge connector assembly fixed to a frame of eyeglasses and fastened around an earpiece in the open position with dashed lines representing the earpiece with attached components in the folded position.
Figure 8:
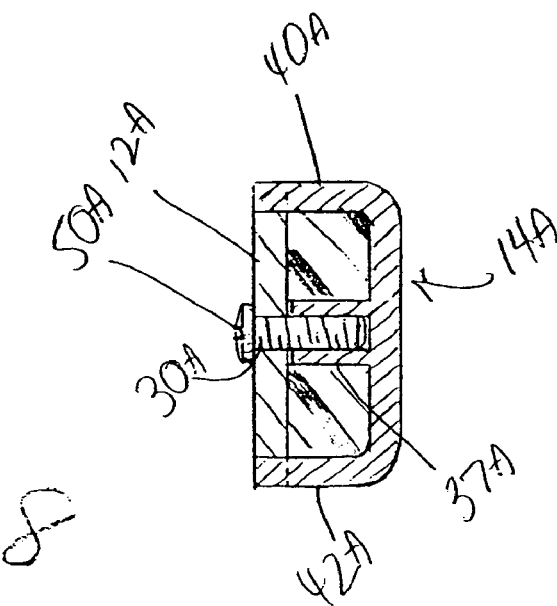
FIG. 8 is a cross sectional view taken along lines 7—7 if FIG. 5 of a hinge connector assembly wherein the hinge connector and connector clamp are fastened around an earpiece.

The connector clamp (14) includes a plate (38) and a tongue (44) which extends from the plate (38) towards the lens frame (17) of the eyeglasses. As shown in FIGS. 2A, 3 and 4, threaded apertures or bores (46,48) that are located on the plate (38) and tongue (44) extend inwardly through apertures (37,39) in the interior of the earpiece (15). Although not shown, the earpiece (15) may also comprise an inner skeletal structure, such as a metallic rod that is flattened at one end, which provides support and helps prevent unwanted flexion in the earpiece (15). In earpieces comprising this skeleton, the bores (46,48) which extend through apertures (37,39) in the interior of the earpiece (15) preferably also proceed through the skeletal structure thereby providing even further support. Further, as depicted in FIGS. 1, 2 and 2A, the clamp plate (38) also includes a plurality of protruding tabs (40, 42) that are received respectively by the notches (26,28) of the hinge connector plate (24). As shown in FIG. 1B, the earpiece (15) includes an inset (41) having generally the same width, length and height dimensions to accommodate the plate (38), tongue (44) and tabs (40,42), wherein the clamp (14) is applied to the earpiece (15) at the inset (41). When the clamp (14) is applied, the top of the plate (38) is generally flush with the exterior lateral surface of the earpiece (15), as shown in FIG. 3, although not necessarily so, as long as there is a secure fit around the earpiece (15). Of course the depth of the inset (41) and thickness of the plate (38) primarily dictate whether the plate (38) is flush with the exterior of the earpiece (15). Generally, conventional means for creating and shaping the inset (41) are well known in the art and any appropriate means may be used.

As shown in FIGS. 2 through 4 the connecting means for holding the clamp (12) and connector (14) in place around the earpiece are a plurality of bolts (50,52) which pass through and are screwed into the threaded bores (46,48), thereby forming a tight and secure fit around the earpiece. Of course, other connecting means known in the art may be used in place of the bolts (50,52) and bores (46,48). Although this embodiment employs two bolts (50,52), any number of additional bolts or even just one bolt can be used in practicing the invention. Further, it should also be understood that the bolt holes (30, 32) which are found on the hinge connector plate (24) and the threaded bores (46,48) which extend from clamp plate (38) and tongue (44) in the embodiments described herein may actually be switched such that the holes are located on the clamp plate and tongue and the threaded bores are located on the hinge connector plate. Moreover, the locations of the notches (26,28) and tabs (40,42) may be inverted as well.

In another preferred embodiment, as shown in FIGS. 5 through 8, the hinge assembly (10A) differs in some aspects. As a result of the reduced height and relatively thinner earpiece (15A), the hinge (16A) attached to the plate (24A) comprises only two hinge ears (18A) rather than three, as shown in the first embodiment of the hinge connecter assembly (10A). As noted above, any number of hinge ears may be utilized depending on the respective height and thickness of the earpiece. Accordingly, for relatively larger earpieces, it would be preferable to use additional hinge ears for purposes of providing increased support and stability.

In this embodiment interior angles formed by the wall (22A) and plate (24A) are approximately one hundred and ten degrees. When compared to the prior embodiment shown in FIGS. 1 through 4 that incorporates an interior angle of ninety degrees, the increased angle allows for increased rotation of the earpiece (15A) when unfolding the glasses to an open position. In this embodiment the frame (17A) is receded to accommodate the wall (22A) that protrudes forward as a result of the increased interior angle.

Although the invention has been described with reference to particular embodiments, it is to be understood that these embodiments are merely illustrative of the application of the principles of the invention. Thus it is to be understood that numerous modifications may be made in the illustrative embodiments of the invention and other arrangements may be devised without departing from the spirit and scope of the invention.

The invention claimed is:

1. A hinge connector assembly for rotatably connecting an earpiece to a frame of glasses, comprising:
    a hinge connector adapted to be located against a first face of said earpiece at a proximal end thereof;
    a hinge element attached to the hinge connector and adapted for rotative connection to a corresponding hinge element attached to said frame;
    a connector clamp adapted to be located against a second face opposite said first face of said earpiece at said proximal end;
    said hinge connector including at least one receiving notch and said clamp including at least one protruding tab adapted to engage said notch when said proximal end of said earpiece is located between said connector and said clamp; and
    connecting means for securing said hinge connector to said connector clamp with the proximal end of the earpiece therebetween.

2. The hinge connector assembly of claim 1, wherein said hinge connector comprises an end wall adapted to be located against a front end of said proximal end of said earpiece.

3. The hinge connector assembly of claim 1, wherein said earpiece has a depression at said proximal end and said hinge connector has an interior ridge adapted to mate with said depression.

4. The hinge connector assembly of claim 1, wherein said connector clamp has a pair of spaced protruding tabs and said hinge connector has a pair of spaced notches, said tabs being adapted to engage said notches around different sides of said proximal end of said earpiece.

5. The hinge connector assembly of claim 1, wherein said connecting means includes a pair of bolt members and the hinge connector has a pair of apertures, wherein said bolt members secure said hinge connector to said connector clamp through said pair of apertures.

6. The hinge connector assembly of claim 1, wherein said connecting means includes a bolt member securing said hinge connector to said connector clamp.

7. The hinge connector assembly of claim 6, wherein said connector clamp further comprises a threaded bore for receiving said bolt.

8. The hinge connector assembly of claim 7, wherein said connector clamp includes a tongue, said tongue accommodating said threaded bore for receiving said bolt.

9. The hinge connector assembly of claim 8, wherein said proximal end of said earpiece includes a pair of apertures, and said tongue includes a pair of threaded bores for receiving a pair of bolts, said bolts passing into said apertures in said earpiece.

10. The hinge connector assembly of claim 9, wherein said earpiece includes a skeletal structure disposed in said earpiece.

11. The hinge connector assembly of claim 10, wherein said skeletal structure has one or more openings and said bolts pass through said openings.

12. The hinge connector assembly of claim 11, wherein said skeletal structure comprises a metallic rod.

13. The hinge connector assembly of claim 1, wherein said earpiece at said proximal end has an indent forming an indented area on an external face thereof and said connector clamp has a tongue adapted to engage said indent in substantially all of said indented area.

14. The hinge connector assembly of claim 13, wherein said tongue is adapted to engage said indent so that an external face of said tongue is in non-protruding alignment with said external face of said earpiece.

15. The hinge connector assembly of claim 1, wherein said connector clamp comprises a plate, said plate being parallel to said second face when said clamp is engaged to said second face.

16. A hinge assembly for connecting a temple to a frame of a pair of eyeglasses, comprising:
   a temple having a distal end and a proximal end and an internal support structure disposed within said temple;
   a first plate located adjacent to an interior surface of said temple;
   a first hinge portion attached to said first plate and adapted for linking at a central axis to a second hinge portion attached to said frame such that said frame and said temple are capable of rotative movement around said central axis;
   a second plate located adjacent to an exterior surface of said temple that is opposite said interior surface;
   a securing means for fastening said first plate to said second plate around said temple,
   said first plate including a one or more receiving notches and said second plate including one or more tabs adapted to be introduced into said notches when said temple is located between said first plate and said second plate; and
   wherein, and said first plate and said second plate are located closer to said proximal end than to said distal end.

17. The assembly of claim 16, wherein said first plate further comprises a first hole and said temple has an second hole that is aligned with said first hole and said securing means includes a screw member that is inserted through said first hole and said second hole.

18. The apparatus of claim 17, wherein said second plate includes a threaded socket positioned in said second hole into which said screw member is further inserted for tightening said first plate and said second plate around said temple.

19. The apparatus of claim 16, wherein said temple includes a depression having a length and a width dimension on said interior surface of said temple and said first plate includes a protruding ridge that has a corresponding length and width dimension allowing said ridge to be rest in said depression.

20. The apparatus of claim 16, wherein said temple includes an inset on said exterior surface of said temple having dimensions that correspond to said second plate wherein said second plate rests in said inset.

21. The apparatus of claim 20, wherein an exterior surface of said second plate is substantially flush with said exterior surface of said temple.

22. A hinge assembly for connecting an earpiece to a frame on a pair of glasses comprising:
   a hinge connector adapted to be located against a first face of said earpiece at a proximal end thereof;
   a hinge element attached to the hinge connector and adapted for rotative connection to a corresponding hinge element attached to said frame;
   a connector clamp adapted to be located against a second face opposite said first face of said earpiece at said proximal end;
   said connector clamp including a one or more receiving notches and said hinge connector including one or more protruding tabs adapted to engage said notches when said proximal end of said earpiece is located between said connector and said clamp; and
   a connecting means for securing said hinge connector to said connector clamp with the proximal end of the earpiece therebetween.

23. The hinge connector assembly of claim 22, further comprising an end wall adapted to be located against a front end of said proximal end of said earpiece.

24. The hinge connector assembly of claim 23, wherein said end wall is attached to said hinge connector.

25. The hinge connector assembly of claim 23, wherein said end wall is attached to said connector clamp.

26. The hinge connector assembly of claim 22, wherein said earpiece has a depression at said proximal end and wherein said hinge connector has an interior ridge adapted to mate with said depression.

27. The hinge connector assembly of claim 22, wherein said hinge connector has a pair of spaced protruding tabs and said connector clamp has a pair of spaced notches, said tabs being adapted to engage said notches around different sides of said proximal end of said earpiece.

28. The hinge connector assembly of claim 22, wherein said connecting means includes a pair of bolt members that secure said connector clamp to said hinge connector through a pair of apertures located in said connector clamp.

29. The hinge connector assembly of claim 22, wherein said connecting means includes a bolt member securing said connector clamp to said hinge connector.

30. The hinge connector assembly of claim 29, wherein said hinge connector further comprises a threaded bore for receiving said bolt member.

31. The hinge connector assembly of claim 30, wherein said hinge connector includes a tongue, said tongue accommodating said threaded bore for receiving said bolt member.

32. The hinge connector assembly of claim 31, wherein said proximal end of said earpiece includes a pair of apertures, and said tongue includes a pair of threaded bores for receiving a pair of bolts members, said bolts member passing into said apertures in said earpiece.

33. The hinge connector assembly of claim 32, wherein said earpiece includes a skeletal structure disposed in said earpiece.

34. The hinge connector assembly of claim 33, wherein said skeletal structure has one or more openings and said bolts pass through said openings.

35. The hinge connector assembly of claim 34, wherein said skeletal structure comprises a metallic rod.

36. The hinge connector assembly of claim 22, wherein said earpiece at said proximal end has an indent forming an indented area on an external face thereof and said hinge connector has a tongue adapted to engage said indent in substantially all of said indented area.

37. The hinge connector assembly of claim 36, wherein said tongue is adapted to engage said indent so that an external face of said tongue is in non-protruding alignment with said external face of said earpiece.

* * * * *